US008352784B2

(12) United States Patent
Burg et al.

(10) Patent No.: US 8,352,784 B2
(45) Date of Patent: Jan. 8, 2013

(54) DEVICE SETTINGS RESTORE POINT

(75) Inventors: David Burg, Bellevue, WA (US); Vlad Sadovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 11/957,514

(22) Filed: Dec. 17, 2007

(65) Prior Publication Data

US 2009/0158295 A1    Jun. 18, 2009

(51) Int. Cl.
*G06F 11/00* (2006.01)
(52) U.S. Cl. ...................................... 714/6.31
(58) Field of Classification Search ................. 714/6.31
See application file for complete search history.

(56) References Cited

U.S. PATENT DOCUMENTS

| | | | |
|---|---|---|---|
| 5,794,245 A * | 8/1998 | Chen ..................................... | 1/1 |
| 5,901,288 A | 5/1999 | Kihara et al. | |
| 5,931,954 A | 8/1999 | Hoshina et al. | |
| 5,956,020 A | 9/1999 | D'Amico et al. | |
| 6,272,545 B1 | 8/2001 | Flanagin et al. | |
| 6,397,229 B1 | 5/2002 | Menon et al. | |
| 6,926,199 B2 | 8/2005 | Jay et al. | |
| 7,310,743 B1 * | 12/2007 | Gagne et al. .................. | 714/6.31 |
| 7,574,591 B2 * | 8/2009 | Downer et al. .................... | 713/1 |
| 7,577,829 B2 * | 8/2009 | Dennis .............................. | 713/1 |
| 8,107,945 B2 * | 1/2012 | Hoffner et al. ................. | 455/419 |
| 2002/0147938 A1 * | 10/2002 | Hamilton et al. .................. | 714/6 |
| 2003/0050940 A1 * | 3/2003 | Robinson ..................... | 707/204 |
| 2004/0225998 A1 | 11/2004 | Van De Vanter et al. | |
| 2005/0022055 A1 * | 1/2005 | Ho .................................. | 714/13 |
| 2005/0050578 A1 * | 3/2005 | Ryal .............................. | 725/143 |
| 2005/0120383 A1 | 6/2005 | Ozaki et al. | |
| 2005/0138468 A1 | 6/2005 | Asare et al. | |
| 2006/0112311 A1 * | 5/2006 | Cobb ............................. | 714/16 |
| 2006/0129659 A1 | 6/2006 | Kawai et al. | |
| 2006/0137010 A1 * | 6/2006 | Kramer et al. .................. | 726/22 |
| 2007/0028063 A1 | 2/2007 | Hars et al. | |
| 2007/0162779 A1 * | 7/2007 | Downer et al. ............... | 713/340 |
| 2007/0162785 A1 * | 7/2007 | Downer et al. ................. | 714/15 |
| 2007/0255934 A1 * | 11/2007 | Dennis ............................. | 713/1 |
| 2007/0294568 A1 * | 12/2007 | Kanda et al. ..................... | 714/6 |
| 2010/0165808 A1 * | 7/2010 | Harada et al. .............. | 369/47.15 |
| 2010/0325679 A1 * | 12/2010 | Ryal ............................. | 725/119 |
| 2011/0289350 A1 * | 11/2011 | Andrews et al. ............. | 714/6.31 |

OTHER PUBLICATIONS

"MigoSync V3", 2007, Migo Software Inc., pp. 1-5.
"Default security settings", 2007, Microsoft Corporation., pp. 6.

* cited by examiner

*Primary Examiner* — Amine Riad
(74) *Attorney, Agent, or Firm* — Capitol City TechLaw; Richard C. Irving

(57) ABSTRACT

A method and a device may be provided for saving and restoring one or more settings associated with the device. The one or more settings may be saved and changed before performing a task. After completion of the task, or after a determined failure of the task to complete, the one or more settings may be restored. Communications may be exchanged between a host and the device to create a restore point for saving the one or more settings, to change any of the one or more settings before performing the task, and to restore the one or more settings after completion of the task, or after determining the failure of the task to complete. The device may create and store the one or more settings in a restore point in the device, or may send the one or more settings to the host for storing.

20 Claims, 10 Drawing Sheets

FIG. 1
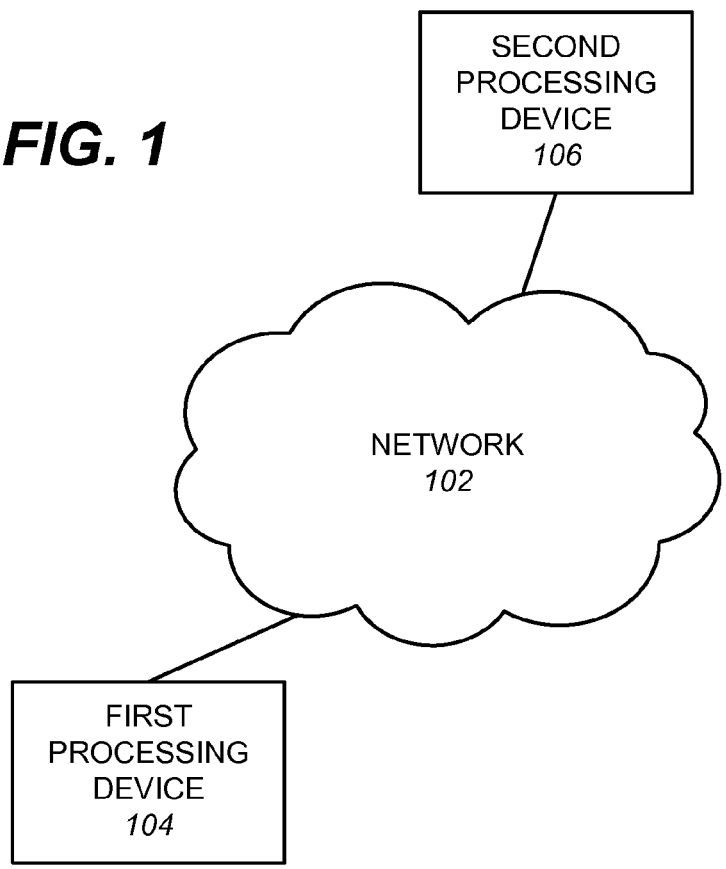
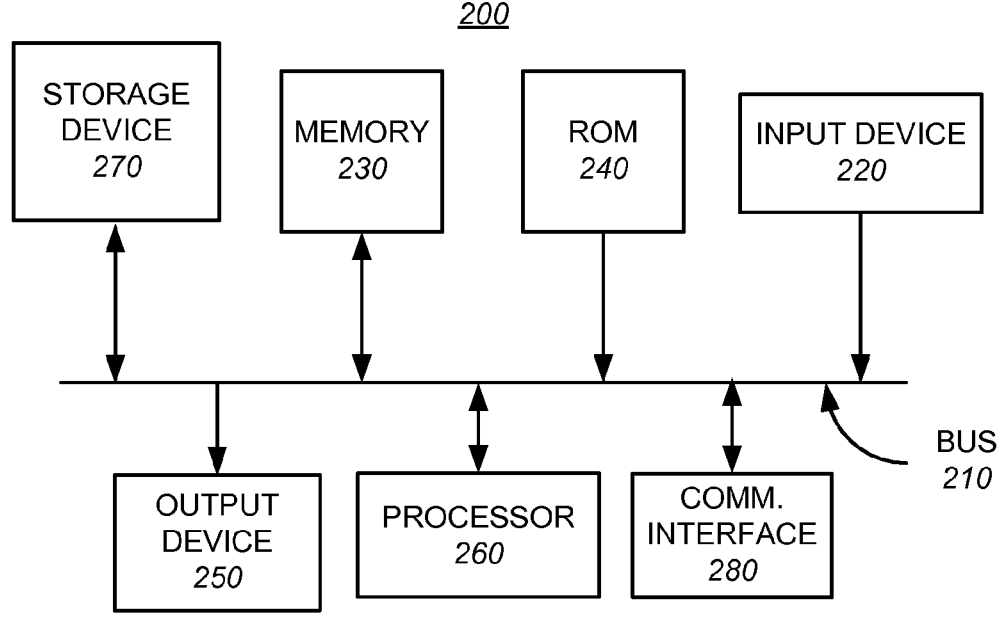
FIG. 2

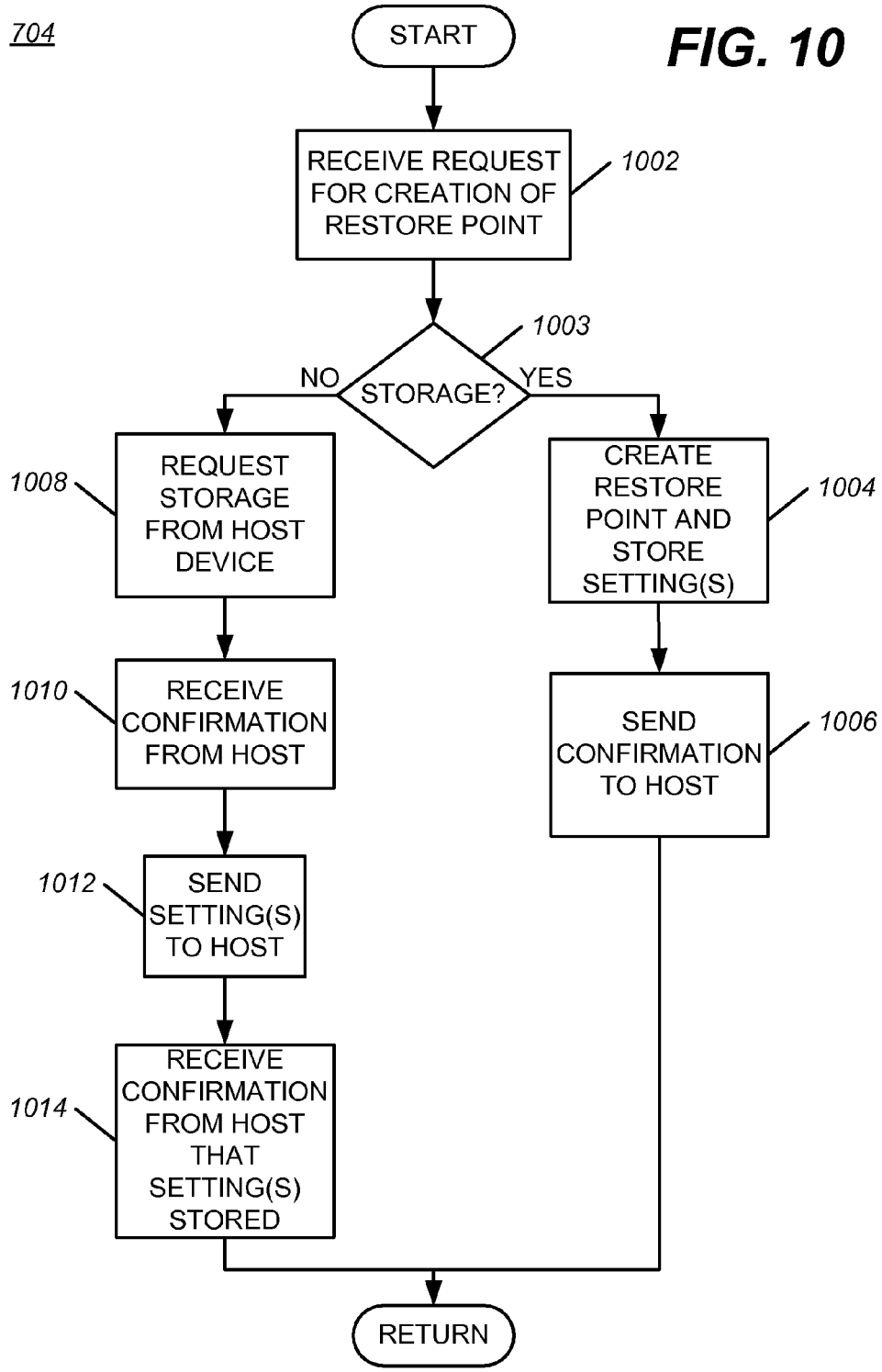

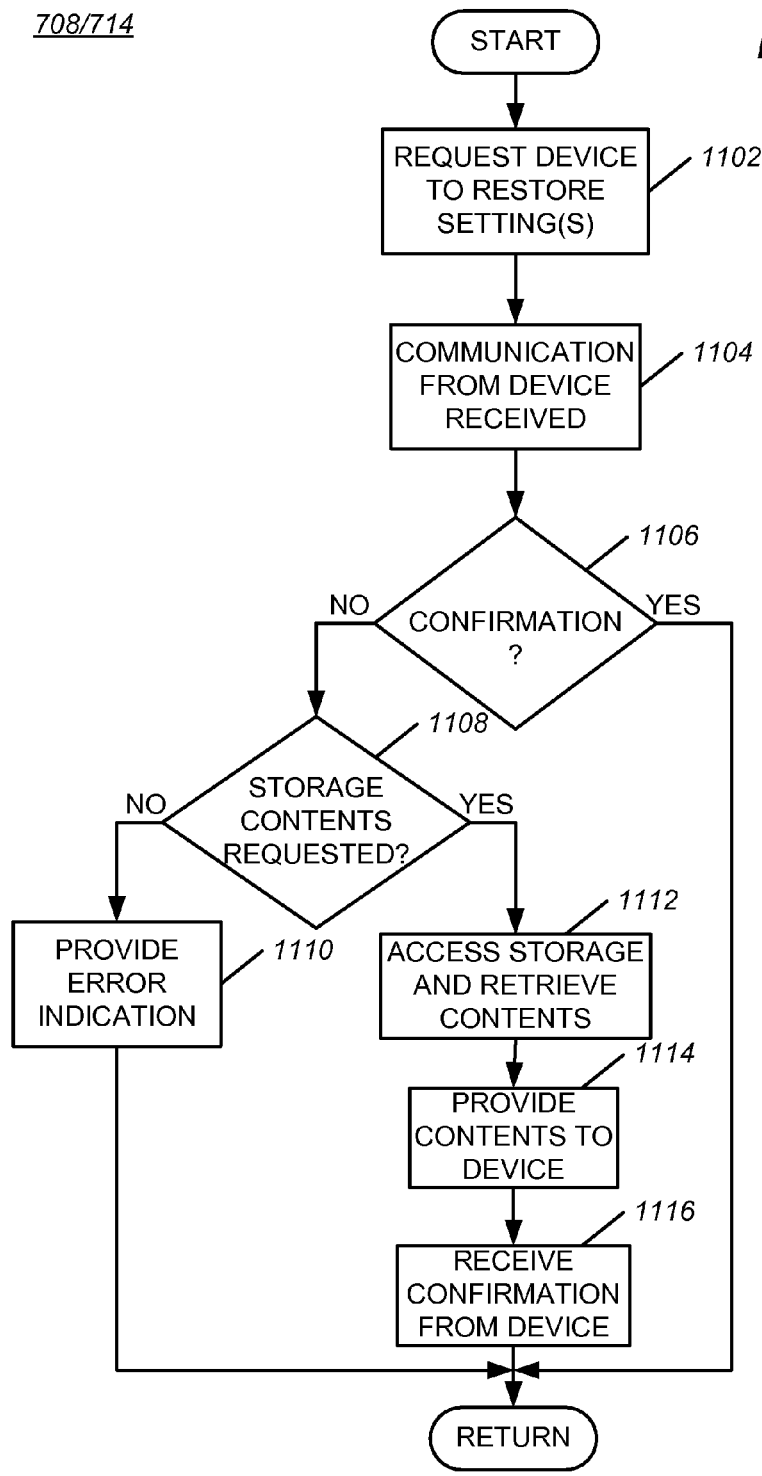

DEVICE SETTINGS RESTORE POINT

BACKGROUND

An application which communicates with one or more devices may be called a host. The host may execute in a processing device and may communicate with one or more devices included within the processing device or connected to the processing device. An operating system may host one or more hosts and thus, may be considered to be a host of hosts, or a meta-host.

In a multi-host environment, a device may be subject to a settings conflict from multiple hosts. In an example involving data encryption on a secret-less client, a first host may change settings associated with a device, such that the first host and the device share a temporary secret in order to permit a particular operation. However, the changed settings may prevent normal operation of the device. The first host may terminate unexpectedly leaving the settings of the device changed. Later, a second host may attempt to communicate with the device. Because the settings remain changed, the device may not operate normally and the second host may be unable to effectively communicate with the device.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a device may be provided. A host, executing in a processing device, may send a request to the device to create a restore point, in which one or more settings associated with the device may be saved. After the restore point is created and the one or more settings associated with the device is saved, the host may send one or more communications to the device regarding creation of a restore point and saving of the one or more settings in the restore point. The host may then change at least some of the one or more settings associated with the device and may perform a task, which may include exchanging one or more communications with the device. After the task is completed, the host may send one or more communications to the device regarding restoring the one or more settings from the restore point. If the task does not complete normally and the host unexpectedly terminates, a meta-host may detect the unexpected termination of the host and may send one or more communications to the device to cause restoration of the one or more settings from the restore point.

In some embodiments, the device may create the restore point in a queue in non-volatile storage, such as, for example, FLASH RAM, or other non-volatile storage. The device may restore the one or more settings from the restore point upon receiving a communication requesting restoration of the one or more settings from the restore point.

In other embodiments, the device may not have storage for creating and storing a restore point. When the device receives a communication from a host requesting creation of a restore point, the device may send a request to a processing device, upon which the host resides, requesting allocation of storage. Upon receiving a confirmation that the storage is allocated, the device may provide the one or more settings to the processing device for storing in a restore point created in the allocated storage. Similarly, when the device receives a communication including a request to restore the one or more settings from the restore point, the device may request the processing device, upon which the host resides, to send the one or more settings saved in the restore point in the allocated storage. The host or a meta-host may be responsible for managing and securing the stored restore points. In some embodiments, well-known transactional semantics may be applied to a process for restoring one or more settings from restore points.

In yet other embodiments, the device may be incapable of processing a communication including a request to create a restore point or restore a restore point. Instead, the processing device, upon which the host resides, may exchange communications with the device to query the device for all settings associated with the device. The processing device may then save all of the settings in a restore point created in storage of the processing device. The processing device may restore the one or more settings by sending one or more communications, including the saved one or more settings from the restore point, to the device to cause the device to change the one or more settings to the saved one or more settings.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 illustrates an exemplary operating environment for embodiments consistent with the subject matter of this disclosure.

FIG. 2 is a functional block diagram of an exemplary processing device, which may implement processing devices shown in FIG. 1.

FIGS. 7-11 are flowcharts illustrating exemplary processes which may be performed in embodiments consistent with the subject matter of this disclosure.

DETAILED DESCRIPTION

Figure 3:
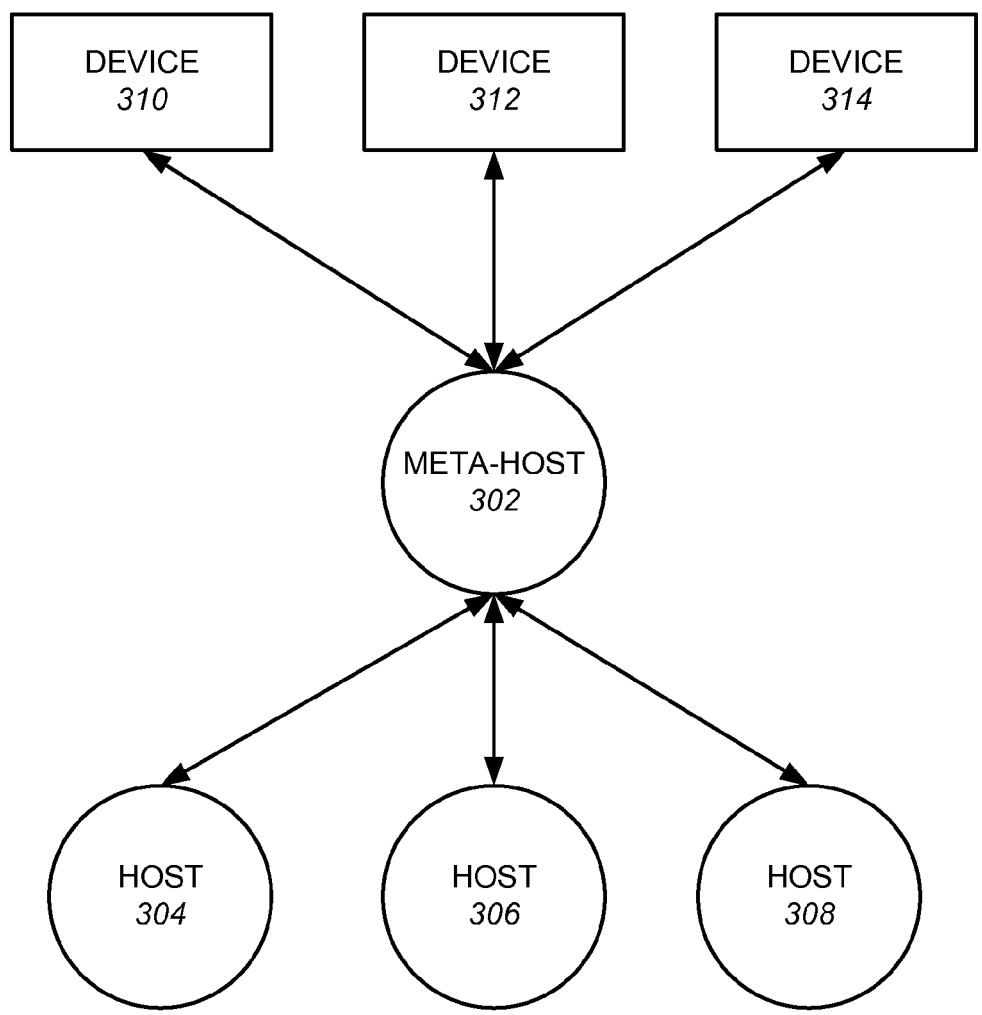
FIG. 3 illustrates exemplary communication among devices, a meta-host, and hosts in an embodiment consistent with the subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a processing device and a method for a host to send one or more first communications to a device to create a restore point, which may include one or more settings associated with the device. After creation of the restore point, the host and the device may change the one or more settings.

In some cases, the host may send the one or more first communications to create a restore point before changing the one or more settings in order to perform a task. After normal completion of the task, the host may send one or more second communications to the device to cause the one or more settings of the device to be restored from the restore point.

In some cases, the task may not complete normally and the host may terminate unexpectedly, or crash, before the one or more settings of the device are restored. A meta-host may detect the crash and may send one or more third communications to the device to cause the one or more settings of the device to be restored from the restore point. In some embodiments, well-known transactional semantics may be applied to a process for restoring the one or more settings from the restore point. In a situation in which an unexpected power loss occurs, the device may apply internal transactional semantics to recover from a partially restored restore point.

In some embodiments consistent with the subject matter of this disclosure, the device, upon receiving the one or more first communications to create a restore point, may create the restore point in a queue in a non-volatile storage component and may store the one or more settings associated with the device in the restore point. The non-volatile storage component may include FLASH RAM and/or other non-volatile storage components, which may be fixed or removable with respect to the device. Similarly, upon receiving the one or more second communications or the one or more third communications to cause the one or more settings associated with the device to be restored from the restore point, the device may access the one or more settings from the restore point in the non-volatile storage component and may restore the one or more settings.

In other embodiments consistent with the subject matter of this disclosure, the device may not have any non-volatile storage components for creating and storing the one or more settings associated with the device. Upon receiving the one or more first communications to create a restore point, the device may send a communication to the host to request allocation of storage for a restore point. Upon receiving confirmation that the storage is allocated, the device may send the one or more settings to the host, via a well-known (standardized) settings exchange protocol, for the host to create the restore point and save the one or more settings in the allocated storage. The well-known settings exchange protocol may be shared among meta-hosts and may include a protocol and a set of formats which describe communication methods and individual or packaged settings.

In additional embodiments consistent with the subject matter of this disclosure, the device may not be configured for responding to communications for creating a restore point and restoring one or more settings associated with the device from the restore point. Instead, the host may send one or more communications to the device to interrogate all settings associated with the device and may create a restore point, including all of the settings associated with the device, in a storage component of a processing device on which the host resides.

Variations of the above-mentioned embodiments consistent with the subject matter of this disclosure may include security features. For example, one or more communications for creating a restore point or restoring one or more settings stored in the restore point may include a digital signature of a requestor, such as, for example, a host sending the one or more communications. If the digital signature is determined to be invalid, the restore point may not be created, or the one or more settings may not be restored. In some embodiments, additional data protection methods may be applied to protect restore points. For example, a restore point may be bound to a device, a host, or a user identified by a well-known identifier.

Exemplary Operating Environment

FIG. 1 illustrates an exemplary operating environment 100 consistent with the subject matter of this disclosure. Exemplary operating environment 100 may include a network 102, a first processing device 104 and a second processing device 106.

Network 102 may be a single network or a combination of networks, such as, for example, the Internet or other networks. Network 102 may include a wireless network, a wired network, a packet-switching network, a public switched telecommunications network, a fiber-optic network, other types of networks, or any combination of the above.

First processing device 104 may be a user's processing device, such as, for example, a desktop personal computer (PC), a laptop PC, a handheld processing device, or other processing device.

Second processing device 106 may include a server. In some embodiments, an operating environment may include multiple second processing devices 106 or servers. The servers may be configured to work together as a server farm.

In some embodiments, an operating environment may simply include a processing device, such as, for example, first processing device 104.

Exemplary Processing Device

FIG. 2 is a functional block diagram of an exemplary processing device 200, which may be used in embodiments consistent with the subject matter of this disclosure to implement first processing device 104 and/or second processing device 106. Processing device 200 may include a bus 210, an input device 220, a memory 230, a read only memory (ROM) 240, an output device 250, a processor 260, a storage device 270, and a communication interface 280. Bus 210 may permit communication among components of processing device 200.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260. Storage device 270 may include compact disc (CD), digital video disc (DVD), a magnetic medium, or other type of storage device for storing data and/or instructions for processor 260. In some embodiments, storage device 270 may include a non-volatile storage device, such as, for example FLASH RAM, or other non-volatile storage device.

Input device 220 may include a keyboard, a pointing device or other input device. Output device 250 may include one or more conventional mechanisms that output information, including one or more display monitors, or other output devices. Communication interface 280 may include a transceiver for communicating via one or more networks via a wired, wireless, fiber optic, or other connection.

Processing device 200 may perform such functions in response to processor 260 executing sequences of instructions contained in a tangible machine-readable medium, such as, for example, memory 230, ROM 240, storage device 270 or other medium. Such instructions may be read into memory 230 from another machine-readable medium or from a separate device via communication interface 280.

FIG. 3 illustrates exemplary communication among devices, hosts and a meta-host in an embodiment consistent with the subject matter of this disclosure. FIG. 3 shows a meta-host 302 communicating with hosts 304, 306, 308 and devices 310, 312, 314. Meta-host 302 may be an operating system residing in a processing device, such as, for example, first processing device 104 or second processing device 106. Hosts 304, 306, 308 may be applications executing in the processing device or in one or more other processing devices. Some of devices 310, 312, 314 may be devices within the processing device in which meta-host 302 resides, such as, for example, a recorder for recording a downloaded movie, or other device within the processing device. Others of devices 310, 312, 314 may instead be devices connected to the processing device in which meta-host 302 resides, such as, for example, an MP3 player, a digital camera, a cell phone, a gaming console, a computing kiosk, or other devices. In some embodiments in which a device is connected to the processing device in which a meta-host resides, FIG. 2 may represent a functional block diagram of the device.

A host, such as, for example, host 304, wishing to communicate with a device, such as, for example, device 310, may communicate with host 304 via meta-host 302. For example, host 304 may request, via meta-host 302, a connection with device 310. Host 304 may then send one or more communications to device 310, via meta-host 302, to create a restore point including one or more settings associated with device 310. Similarly, hosts 306, 308 may establish connections with other devices, such as, for example, devices 312, 314 and may send one or more communications to devices 312, 314 to create restore points including one or more settings associated with respective devices 312, 314. After completing a task, but before disconnecting from a respective device, hosts 304, 306, 308 may send one or more communications to respective devices 310, 312, 314 to restore the one or more settings included in the respective restore points.

If one of hosts 304, 306, 308 terminates unexpectedly, meta-host 302 may detect the unexpected termination and may send the one or more communications to restore the one or more settings included in one of the respective restore points to a respective one of devices 310, 312, 314. Meta-host 302 may detect an unexpectedly terminated host via a number of different methods. For example, hosts 304, 306, 308 may periodically send I'm alive messages to meta-host 302. Meta-host 302 may determine that one of hosts 304, 306, 308 is terminated when a predetermined number of I'm alive messages from the one of hosts 304, 306, 308 has not been received. In another embodiment, meta-host 302 may keep track of which of hosts 304, 306, 308 are connected to devices 310, 312, 314. After a host, such as, for example, host 304, unexpectedly terminates, the host may again restart and may again request a connection to a device, such as, for example, device 310. Meta-host 302 may receive the request for host 304 to connect to device 310, which meta-host 302 believed was already connected to host 304. Meta-host 302 may then determine from the above that host 304 previously terminated unexpectedly.

The above described methods by which meta-host 302 may determine unexpected termination of a host are only exemplary. Numerous other methods for meta-host 302 to detect termination of a host may be implemented in other embodiments consistent with subject matter of this disclosure.

A device, such as, for example, device 310, may detect abnormal termination (caused by, for example, a crash or power loss) of a meta-host, such as, meta-host 302. The device may recover one or more settings by restoring the one or more settings from a restore point upon restoration of power or operation of meta-host 302. The device may recover by applying well-known transactional semantics or by applying internal transactional semantics (in case of a power loss).

Further, in other embodiments not all communications between a host and a device may pass through a meta-host. For example, in some embodiments, only communications for connecting or disconnecting a host with a device may pass through a meta-host, while other communications, such as communications for creating a restore point and restoring settings from a restore point may pass directly between a host and a device without involving a meta-host. In such embodiments, the meta-host may determine failure of a host by an absence of received I'm alive messages from the failed host, or via other methods.

In some embodiments, in addition to a host creating a restore point, a meta-host may create a restore point on behalf of the host. For example, the meta-host may systematically create a restore point before allowing the host to communicate with a device, such that the restore point is available in case of an unexpected application failure. Further, the meta-host, itself, may create a restore point before further communicating with the device and may use the restore point if the meta-host has an unexpected termination.

In yet other embodiments, a meta-host may provide storage for a host and may communicate with the device, accordingly, either by acting as a proxy for the host, or by filtering a host communication with the device and providing requests to the device and responses to the device (on behalf of the host). Thus, the creating and restoring of restore points may be performed by the meta-host and may be transparent to the host. Further, the meta-host may abstract the host, with respect to differences regarding devices with non-volatile memory, devices without non-volatile memory, and devices not having any knowledge of how to create a restore point.

Exemplary Communications

Figure 4:
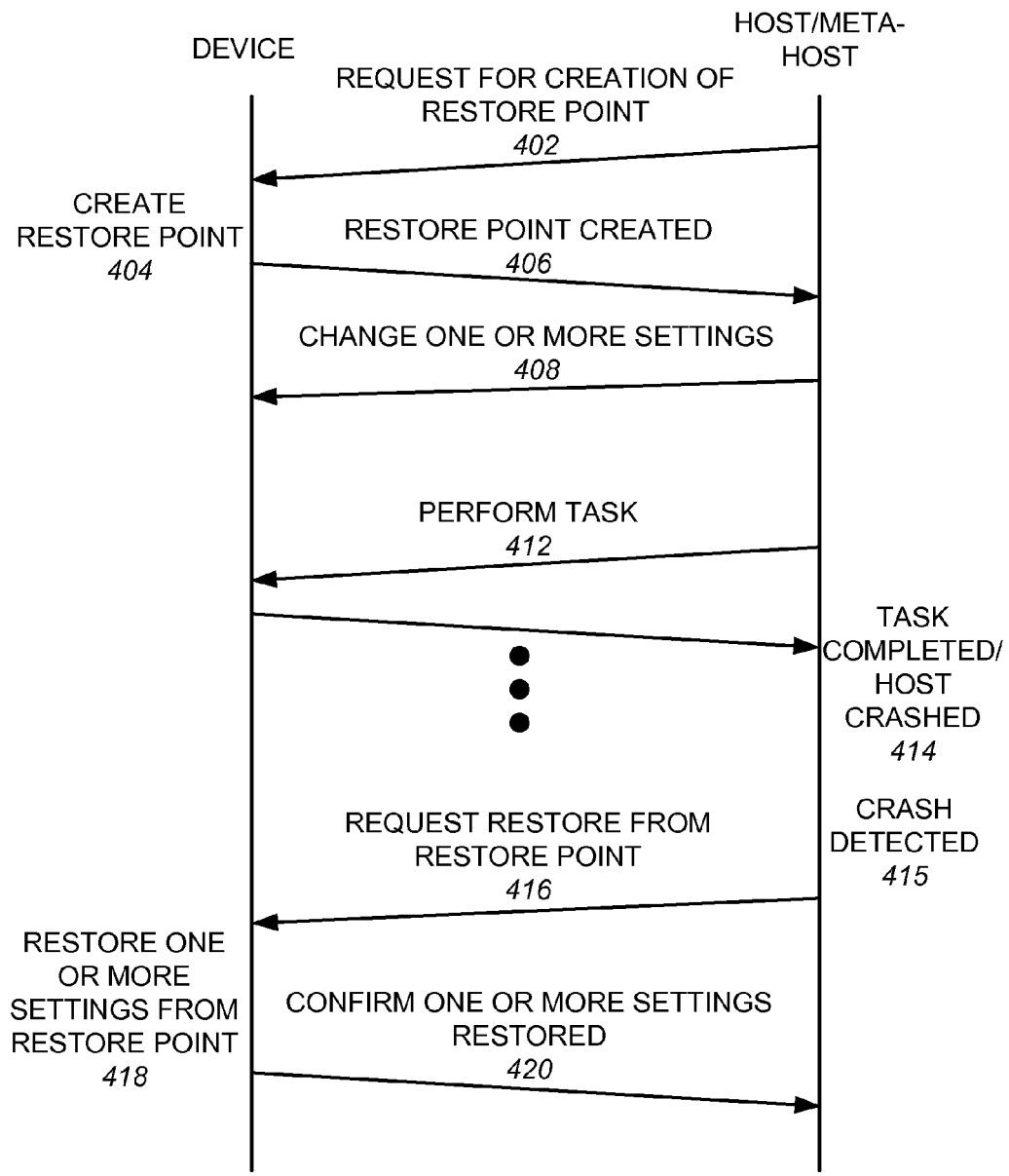
FIGS. 4-6 are charts illustrating exemplary communications between a host and a device in embodiments consistent with the subject matter of this disclosure.

FIG. 4 is a chart illustrating exemplary communications between a device and a host or meta-host in an embodiment consistent with the subject matter of this disclosure. In this embodiment, the device understands a command for creating a restore point and restoring the one or more settings from the restore point. The host or meta-host (hereinafter, "host" for simplicity's sake) may send a communication to the device requesting creation of a restore point (402). The host may request exclusive access to the device before sending the communication to the device. The device may receive the request for creation of the restore point, may create the restore point, and may store one or more settings associated with the device in the restore point (404). The device may create the restore point in a queue in a non-volatile storage component, such as, for example, a FLASH RAM storage component, or other non-volatile storage component. The device may then send a communication to the host indicating that the restore point was created (406).

The host may then perform a task, which may include sending one or more communications to and/or receiving one or more communications from the device (412). After completing the task (414), the host may send a request to the device to restore the one or more saved settings from the restore point (416).

If the host terminates unexpectedly or crashes before completing the task, the crash may be detected by the meta-host (415). If the meta-host detects that the host crashed, then the meta-host may send a request to the device to restore the one or more saved settings from the restore point (416).

After receiving the request to restore the one or more settings from the restore point, the device may then restore the one or more settings from the restore point (418). If the restore point was stored in a non-volatile storage component, then the device may retrieve the one or more settings from the restore point in the non-volatile storage component and may restore the one or more settings. The device may then send a communication to the host confirming that the one or more settings associated with the device have been restored (420). If the host had previously requested and been granted exclusive access to the device, the host may release the exclusive access.

Figure 5:
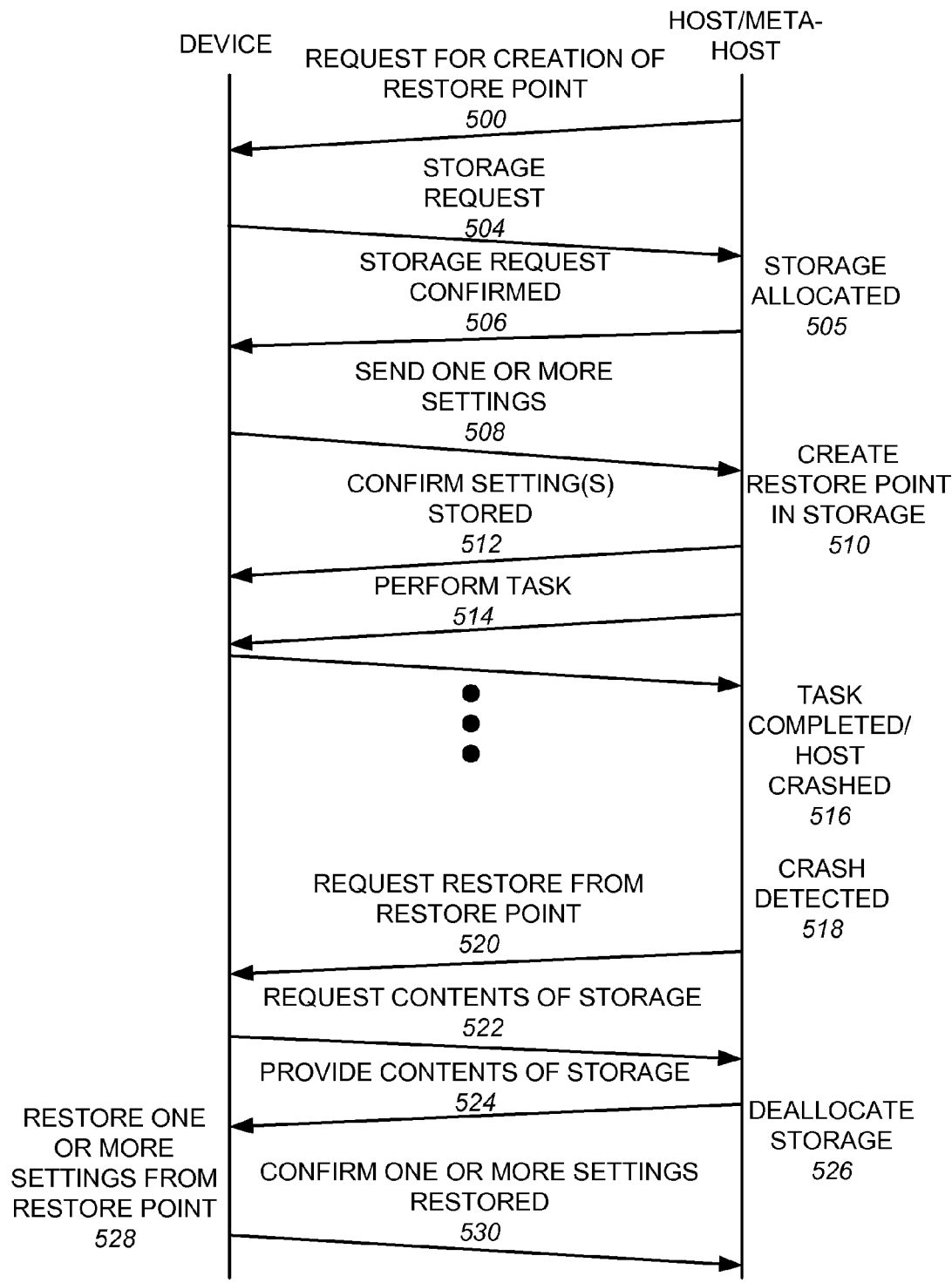

FIG. 5 is a chart illustrating exemplary communications between a device and a host (or meta-host) in a second embodiment consistent with the subject matter of this disclosure. In the second embodiment, the device understands a communication for creating a restore point and a communication for restoring the one or more settings from the restore point. However, the device may not have storage for storing the restore point. The host may request exclusive access to the device and may send a communication to the device requesting creation of a restore point to store one or more settings associated with the device (500). Because the device, in this embodiment, does not have storage for a restore point, the device may send a communication requesting storage to the host (504). The processing device on which the host resides may then allocate storage for the restore point (505) and may send a communication to the device confirming that the storage was allocated (506). The communication confirming allocation of the storage may include an identifier of the allocated storage. The device may then send a communication including the one or more settings associated with the device to the host (508). The host may then create the restore point in the allocated storage and may store the one or more settings associated with the device in the restore point (510). The host may then send a communication to the device confirming that the one or more settings have been stored (512).

The host may then perform a task, which may include sending one or more communications to and/or receiving one or more communications from the device (412). After completing the task (516), the host may send a request to the device to restore the one or more saved settings from the restore point (520).

If the host terminates unexpectedly or crashes before completing the task, the crash may be detected by a meta-host (518). If the meta-host detects that the host crashed, then the meta-host may send a request to the device to restore the one or more saved settings from the restore point (520).

After receiving the request to restore the one or more settings from the restore point, the device may send a communication to the host requesting content of the allocated storage (522). The communication requesting the content of the allocated storage may include the identifier of the allocated storage. The host may then provide the contents of the allocated storage corresponding to the identifier (524) and may de-allocate the storage (526).

The device may receive the contents of the storage provided by the host and may restore the one or more settings from the contents of the restore point (528). The device may then send a communication to the host confirming that the one or more settings associated with the device have been restored (530) and the host may release exclusive access to the device, if previously requested and granted.

As mentioned above, FIG. 5 illustrates exemplary communications between a device and a host (or a meta-host). In other embodiments restore points may not be deallocated after one use. For example, restore points may be reusable and may be restored multiple times. In such embodiments, the restore points may not be automatically deallocated, but may be explicitly deallocated and deleted. Further, in some embodiments, the host may delay deallocating and deleting a restore point until a confirmation is received confirming successful completion of the restore operation.

Figure 6:
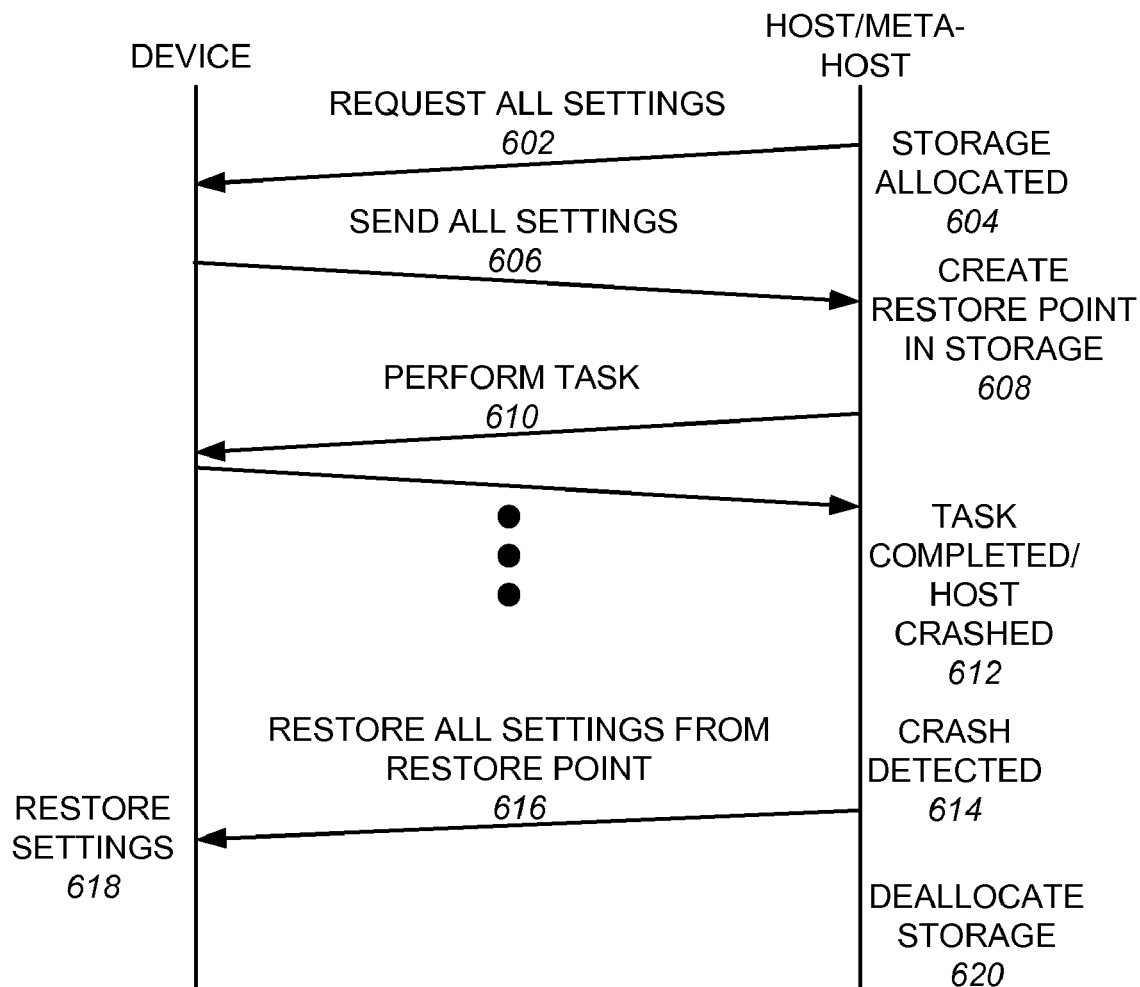

FIG. 6 is a chart illustrating exemplary communications between the device and a host or a meta-host in a third embodiment consistent with the subject matter of this disclosure. In the third embodiment, the device does not understand a command for creating a restore point and restoring the one or more settings from the restore point. The processing device, upon which the host resides, may detect that the device does not understand the command for creating a restore point and restoring the one or more settings from the restore point. In one embodiment a driver residing on the processing device, upon which the host resides, may determine that the device does not understand the command for creating a restore point and restoring the one or more settings from the restore point based on a code, or lack thereof, in a communication to the host from the device. Of course, other methods may be implemented for determining that the device does not understand the command for creating a restore point and the command for restoring the one or more settings from the restore point.

Knowing that the device does not does not understand the command for creating a restore point and restoring the one or more settings from the restore point, the host may request and be granted exclusive access to the device and may send one or more communications to the device requesting the device to send all settings associated with the device (602). The processing device, upon which the host resides, may then allocate storage for a restore point (604). The device may receive the one or more communications and may send the one or more communications including all settings associated with the device (606). The host may receive the one or more communications including all of the settings associated with device, may create the restore point in the allocated storage, and may store all of the settings associated with the device into the created restore point (608).

The host may then perform a task, which may include sending one or more communications to or receiving one or more communications from the device (610). After completing the task (612), the host may send one or more communications, including all of the saved settings associated with the device, to the device to restore the one or more saved settings from the restore point in the allocated storage (616).

If the host terminates unexpectedly or crashes before completing the task, the crash may be detected by the meta-host (614). If the meta-host detects that the host crashed, then the meta-host may send one or more communications, including all of the saved settings associated with the device, to the device to restore the one or more saved settings from the restore point in the allocated storage (616).

After receiving the one or more settings from the device, the device may then restore the one or more settings (618). The host or the meta-host may then release the exclusive access to the device, if previously requested and granted. The processing device, upon which the host resides, may then deallocate the storage that included all of the settings associated with the device (620).

Exemplary Tasks

The following are exemplary tasks which may be performed in embodiments consistent with the subject matter of this disclosure. The tasks are only exemplary and are not intended to be an exhaustive list of all tasks which may be performed.

In a first example, a device may be included in a user's personal computer (PC). The device, in this example, may be used to record a downloaded movie. A movie may be downloaded to a host. However, a license key associated with a license for recording content may be missing. Once the movie is a downloaded to the host, the device and a license key server may communicate to exchange a secret (for example, the license key). The license key, typically, may be a temporary device setting that does not work during normal operation. After recording of the movie with the license key is completed, the restore point may be restored, such that the device may again operate normally.

In a second example, the device may be included in the user's PC and may be capable of writing to non-volatile storage including firmware. The device may not write to the non-volatile storage unless a particular sequence is sent to the device. An application in the user's PC (a host) may make a connection to the device and to a server, having access to upgraded firmware, via a network. The host may receive the particular sequence from the server, may request exclusive access to the device, and may request the device to create a restore point and store one or more settings associated with the device. In this example, the one or more settings may include portions of the non-volatile storage having content to be upgraded, or revised. The host may then send the particular sequence to the device and may request the server to download the upgraded firmware. The host may receive the upgraded firmware from the server, may send the upgraded firmware to the device, which may write the upgraded firmware to the non-volatile storage, and may release the exclusive access. If the device does not operate correctly with the upgraded firmware, the host may request exclusive access to the device, may request the one or more settings associated with the device be restored from the restore point, and may release the exclusive access to the device.

In a variation of the second example, the upgraded firmware and the particular sequence may be communicated directly from the server to the device, using the host as a pass-through proxy only, such that neither the upgraded firmware nor knowledge of the particular sequence may be stored in the host. The variation of the second example may provide an additional layer of security for a hardware vendor against malicious users who may attempt to reverse engineer either the upgraded firmware or the particular sequence, or both.

Other examples of devices, which may be used in embodiments consistent with the subject matter of this disclosure, may include processing devices, such as, for example, a PC, a gaming console, a kiosk capable of communicating with a processing device, a cell phone, a digital camera, a music player, or other device having a processor.

In addition to restore points created by the host, one or more factory default restore points may be predefined. For example, motherboards may have a "safe default" restore point and an "optimized default" restore point for a Basic Input/Output System (BIOS) of the motherboards. The "safe default" restore point and the "optimized default" restore point may be read-only and protected against deletion or modification.

Exemplary Processing

Figure 7:
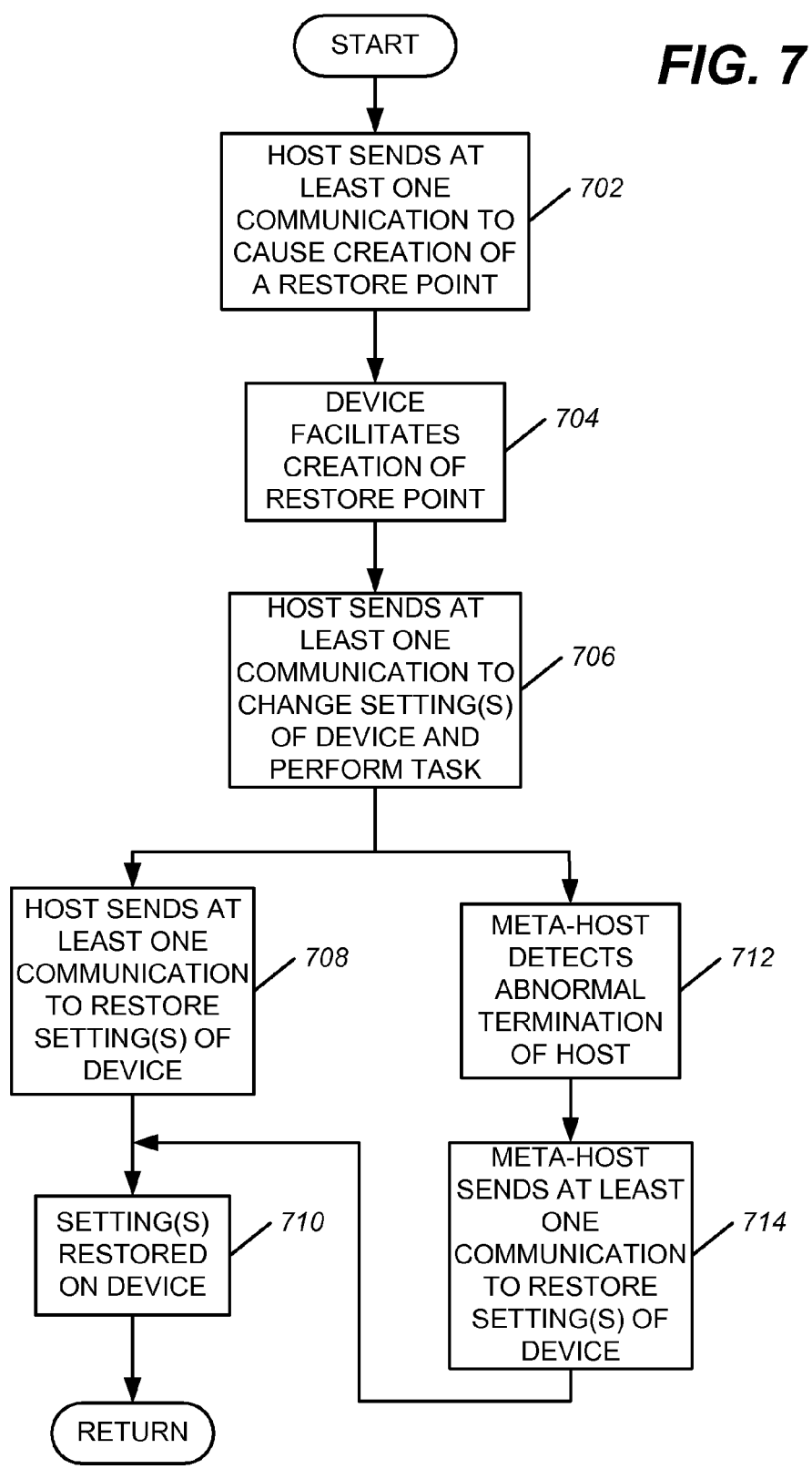

FIG. 7 is a flowchart illustrating exemplary processing, which may be performed in embodiments consistent with the subject matter of this disclosure. The process may begin with a host sending at least one communication to a device to cause creation of a restore point including one or more settings associated with the device (act 702). In some embodiments, the host may request exclusive access to the device before, or immediately after, performing act 702.

Figure 8:
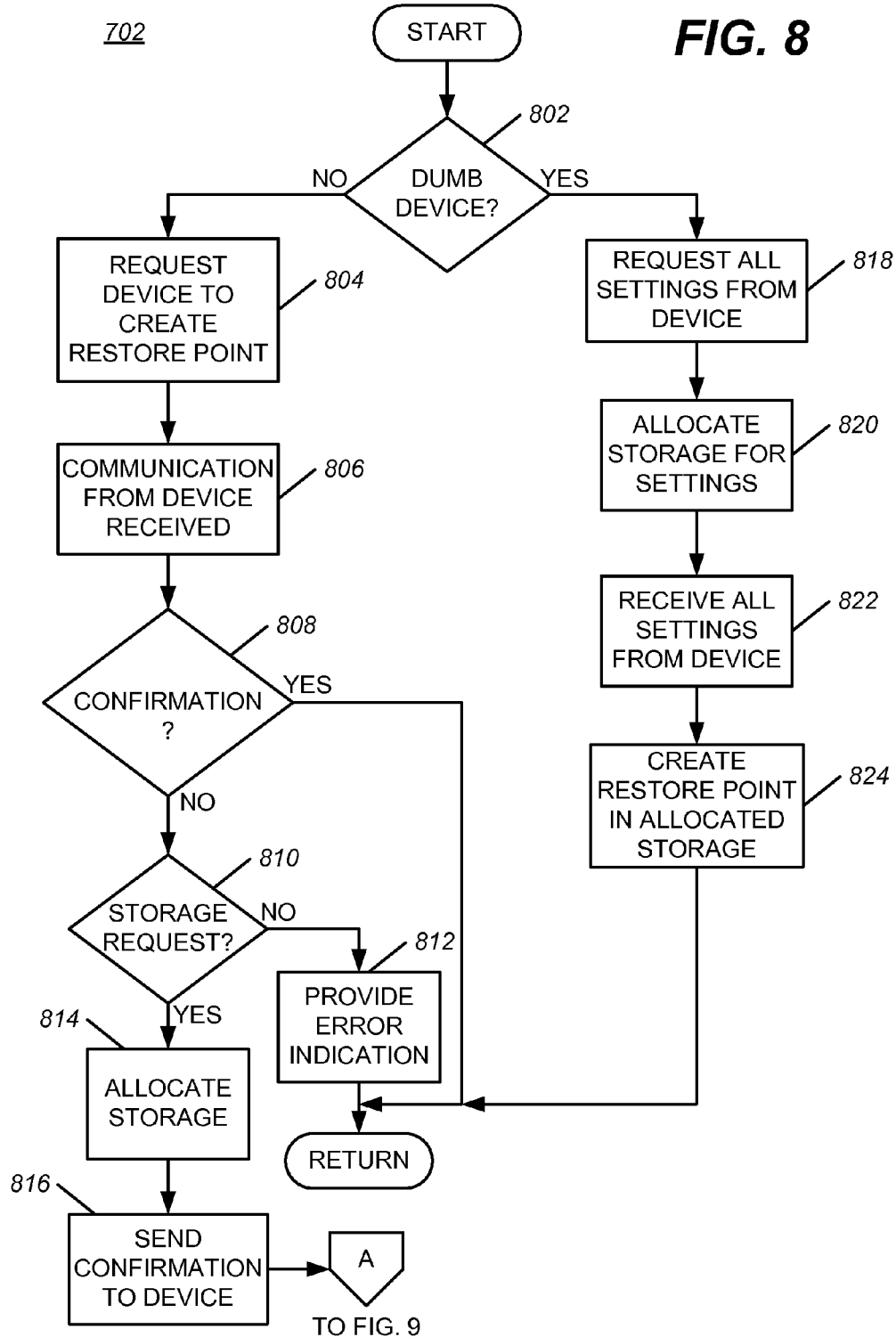

FIG. 8 is a flowchart illustrating exemplary detailed processing with respect to act 702 from a point of view of the host. The process may begin with the host determining whether the device is a dumb device (act 802). In this application, a dumb device refers to a device that is incapable understanding communications including a command for creating or restoring a restore point. A processing device, upon which the host resides, may determine whether the device is a dumb device in a number of different ways. For example, the processing device may send a query to the device and may determine whether the device is a dumb device based on a response to the query. Of course, numerous other methods may be implemented in various embodiments consistent with the subject matter of this disclosure.

If the host determines that the device is not a dumb device, then the host may send a communication to the device to request the device to create a restore point, including at least one setting associated with the device (act 804). In some embodiments, the communication for requesting creation of a restore point may include a digital signature of a requester, such as, for example, the host or other requester. If the digital signature is determined to be invalid, then the request for creation of a restore point may be discarded.

The host may receive, in response to sending the communication for requesting creation of a restore point, a communication from the device (act 806). The host may determine whether the communication from the device is a confirmation with respect to creating a restore point (act 808). If the communication from the device is a confirmation, then the process with respect to act 702 may be completed.

If, during act 808, the host determines that a communication from the device is not a confirmation, with respect to creating a restore point, the host may determine whether the communication from the device is a storage request for requesting storage for a restore point on a processing device, upon which the host resides (act 810). If the communication from the device is not a storage request, then the host may provide an error indication (act 812) and the process with respect to act 702 may be completed.

If, during act 810, the host determines that the communication from the device is a storage request, then the processing device, upon which the host resides, may allocate storage (act 814) and may send a confirmation to the device confirming allocation of the storage (act 816). In some embodiments, the confirmation of the allocation of storage may include an identifier to identify an entry of the allocated storage.

Figure 9:
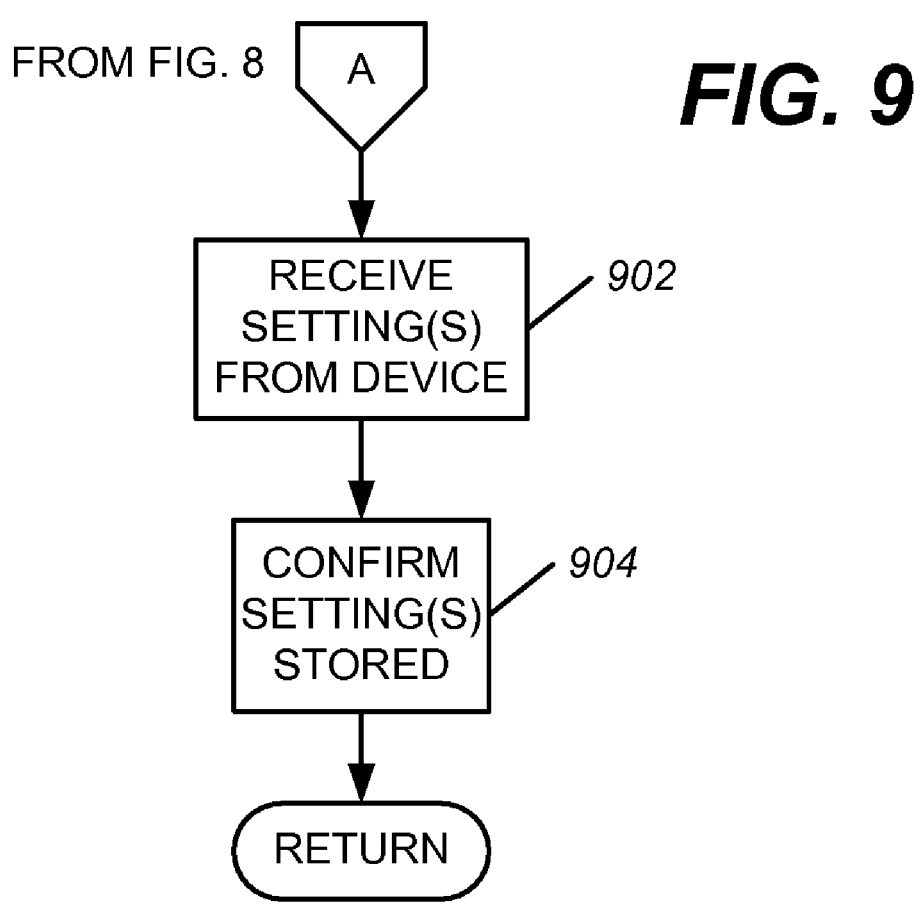

After sending the confirmation of the allocation of storage, the processing device, upon which the host resides, may receive one or more settings from the device and may store the one or more settings in the restore point in the allocated storage (act 902; FIG. 9). The one or more settings from the device may be included in a communication with the identifier of the entry of the allocated storage. The host may send a communication to the device confirming that the one or more settings have been stored in the restore point in the allocated storage (act 904).

If, during act 802, the host determines that the device is a dumb device, then the host may send one or more communications to the device to request information with respect to all settings associated with the device (act 818; FIG. 8). The processing device, upon which the host resides, may then allocate storage for the settings associated with the device (act 820).

The host may then receive all the settings associated with the device (act 822) and may then create a restore point, including all the settings associated with the device, in the allocated storage (act 824). The processing with respect to act 702 may then be completed.

Returning to FIG. 7, upon receiving the one or more communications from the host to cause creation of the restore point, the device may facilitate creation of the restore point (act 704). If the device is a dumb device, the device may facilitate creation of the restore point by providing to the host all of the settings associated with the device in response to receiving the one or more communications from the host requesting information with respect to all of the settings associated with the device.

FIG. 10 is a flowchart of an exemplary detailed process for performing act 704 in a non-dumb device, in embodiments consistent with the subject matter of this disclosure. The process may begin with the device receiving a request for creation of a restore point (act 1002). In some embodiments, the request may effectively be a "save everything" message informing the device to save all settings. In such embodiments, the host may not have knowledge of what "all settings" means with respect to the device. The device may then determine whether the device has storage available for creating a restore point (act 1003).

If the device determines that storage is available for creating a restore point, then the device may create the restore point in a queue in the storage and may store one or more settings associated with the device into the restore point (act 1004). In some embodiments, the device may store all settings associated with the device into the restore point. The storage may be non-volatile storage, such as, for example, FLASH RAM or other non-volatile storage. In other embodiments, the storage may be volatile storage, such as, for example, RAM, or other volatile storage. The device may then send a communication to the host confirming that the restore point has been created (act 1006). The process may then be completed.

If, during act 1003, the device determines that no storage is available for creating a restore point, then the device may send a communication to the host requesting storage (act 1008). The device may then receive a communication from the processing device, upon which the host resides, confirming that the storage has been allocated (act 1010). In some embodiments, the communication from the processing device may include an identifier with respect to the allocated storage. After receiving the confirmation with respect to the allocation of the storage, the device may send one or more communications including the one or more settings associated with the device to the host (act 1012). The communication, including the one or more settings, may further include the identifier, with respect to the allocated storage, and may also include a digital signature of the device. The device may then receive a communication from the host confirming that the one or more settings have been stored in the allocated storage (act 1014). The process may then be completed.

Returning to FIG. 7, the host may send one or more communications to the device to change the one or more settings associated with the device and to perform a task (act 706). Assuming that the task is completed normally, the host may send one or more communications to the device to restore the one or more settings associated with the device (act 708). In some embodiments, the one or more settings associated with the device may only be restored when a requester (for example, a host) is authorized. For example, the one or more communications to the device to restore the one or more settings may include a digital signature of the requester. If the one or more communications to restore the one or more settings include an invalid digital signature, then the device may discard the one or more communications. Otherwise, the device may restore the one or more settings associated with the device (act 710). If the host previously requested and received exclusive access to the device, the host may now release the exclusive access. The process may then be completed.

If the host terminates abnormally, or crashes, before completion of the task, a meta-host may detect the crash (act 712). The meta-host may then send at least one communication to the device to restore the one or more settings associated with the device (act 714). Act 710 may then be performed, as described above. If the host previously requested and received exclusive access to the device, the meta-host may release the exclusive access. The process may then be completed.

FIG. 11 is a flowchart illustrating an exemplary detailed process, which may be performed with respect to acts 708 and/or 714. The process may begin with the host (act 708) or the meta-host (act 714) sending a communication to the device to request the device to restore the one or more settings (act 1102). A communication from the device may then be received (act 1104).

A check may be made to determine whether the received communication from the device is a confirmation that the one or more settings have been restored (act 1106). If the received communication is determined to be a confirmation that the one or more settings have been restored, then the process may be completed.

If the check made during act 1106 determines that the received communication from the device is not a confirmation, then a check may be performed to determine whether the communication is a request for contents included in allocated storage (act 1108). If the received communication is not a request for contents included in allocated storage, then an error indication may be provided (act 1110). If the received communication is a request for contents included in allocated storage, then the host or meta-host may access the allocated storage and retrieve the contents (act 1112).

In some embodiments, the request for contents included in allocated storage may include an identifier for identifying a portion of the allocated storage. The request for contents may further include a digital signature of the device. In such embodiments, if the digital signature is not valid, the host or meta-host may discard the request for contents.

After accessing the allocated storage and retrieving the contents, the host or meta-host may send one or more communications to the device to provide the device with the contents (act 1114). The host or meta-host may then receive a communication from the device confirming restoration of the one or more settings (act 1116). The process may then be completed.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. For example, in the above-described embodiments, when a device requests storage from a host, the device may wait for a confirmation that the host allocated the storage before providing settings to the host. However, in other embodiments, the device may assume that the storage will be allocated by the host after the device requests storage. In such embodiments, the device may not wait for the confirmation before providing the settings to the host. Further, in some embodiments, several restore points may be created concurrently, some of which may not be restored. Each of the restore points may be identified by a unique identifier generated by the device or the host. The unique identifier may be used in communications including a request to restore a restore point. Thus, the restore points may be restored in any order. In another embodiment, a meta-host may utilize a queue of the meta-host to integrate device restore points with restore points of the meta-host. Further, implementations consistent with the subject matter of this disclosure may have more or fewer acts than as described, or may implement acts in a different order than as shown. Accordingly, the appended claims and their legal equivalents define the invention, rather than any specific examples given.

We claim as our invention:

1. A machine-implemented method for a host to interact with a first device, the machine-implemented method comprising:
  receiving, by a driver residing in a processing device upon which the host or a meta-host resides, a first communication from the first device;
  determining, by the driver, whether the first device is capable of understanding a command for creating a restore point and a command for restoring at least one setting associated with the first device from a restore point based on a presence or an absence of a code in the received first communication, a result of the determining affecting communications between the host or the meta-host and the first device with respect to creating the restore point and restoring the at least one setting of the first device from the restore point;
  sending at least one second communication from one of the host or the meta-host to the first device to cause creation of a restore point for saving at least one setting associated with the first device;
  sending at least one third communication from the host to the first device to change the at least one setting associated with the first device;
  sending at least one fourth communication from the meta-host to the first device to restore the at least one setting of the first device when the meta-host detects that the host communicating with the first device terminated unexpectedly; and
  sending the at least one fourth communication from the host to the first device to restore the at least one setting of the first device after the host terminates normally, wherein:
  when the driver determines that the first device is capable of understanding the command for creating a restore point and the command for restoring at least one setting associated with the first device from a restore point, the at least one second communication includes only one or more communications other than a request for the at least one setting associated with the first device.

2. The machine-implemented method of claim 1, wherein:
  when the driver determines that the first device is capable of understanding the command for creating a restore point and the command for restoring at least one setting associated with the first device from the restore point, the sending of the at least one second communication from one of the host or the meta-host to the first device to cause creation of a restore point, further comprises:
  sending a communication to the first device to cause the first device to create the restore point in a FLASH RAM associated with the first device.

3. The machine-implemented method of claim 1, wherein when the driver determines that the first device is capable of understanding the command for creating a restore point and the command for restoring at least one setting associated with the first device from the restore point, the at least one fourth communication includes a request for the first device to restore the at least one setting from the restore point.

4. The machine-implemented method of claim 1, wherein:
  the host and the first device are capable of changing the one or more settings associated with the first device, and
  communications among the meta-host, the first device, and the host use a well-known protocol and a set of formats describing communication methods and individual or packaged settings.

5. The machine-implemented method of claim 1, wherein:
  the at least one third communication and the at least one fourth communication include respective digital signatures,
  the at least one setting remains unchanged when the digital signature included in the at least one third communication is invalid, and
  the at least one setting is not restored when the digital signature included in the at least one fourth communication is invalid.

6. The machine-implemented method of claim 1, wherein:
  when the driver determines that the first device is not capable of understanding the command for creating a restore point and the command for restoring at least one setting associated with the first device from the restore point, the sending of at least one second communication from the host to the first device to cause creation of a restore point, further comprises:
  sending, by the host, at least one fifth communication to the first device to obtain the at least one setting from the first device, and
  storing, by the host, the at least one setting in a storage device of the processing device on which the host resides; and
  the machine-implemented method further comprises:
  sending, from the host, at least one sixth communication, including the stored at least one setting, to the first device for the first device to restore the at least one setting.

7. The machine-implemented method of claim 1, further comprising:
  when the driver determines that the first device is capable of understanding the command for creating a restore point and the command for restoring at least one setting associated with the first device from the restore point, performing:
  receiving a request from the first device for storage, in response to the sending of the at least one second communication;
  allocating, by the host, the storage in response to receiving the request for the storage;

sending, from the host to the first device, a confirmation that the storage is allocated;

receiving from the first device, in response to the sending of the confirmation that the storage is allocated, the at least one setting;

storing, by the host, the received at least one setting in the restore point in the storage;

receiving, by the host, a request from the first device for contents of the restore point; and sending, by the host, the contents of the restore point to the first device, the first device being arranged to restore the at least one setting from the contents of the restore point.

8. The machine-implemented method of claim 1, further comprising:

sending, by the host, a firmware upgrade to the first device, wherein the at least one setting associated with the first device includes at least a portion of firmware associated with the first device before the firmware upgrade.

9. The machine-implemented method of claim 1, further comprising:

acting, by the host, as a pass-through proxy to pass a firmware upgrade, received by the host, to the first device without the host storing the firmware upgrade.

10. A device comprising:

at least one processor; and a memory connected to the at least one processor, the memory comprising instructions for the at least one processor of the device to perform a method, the method comprising:

determining whether the device has storage available for creating a restore point, in response to the device receiving a request from a host for the device to create the restore point;

sending a first communication to the host to request storage when the device determines that the device has no storage available for creating the restore point;

receiving a second communication from the host confirming that the storage has been allocated in response to the sending a first communication;

sending at least one third communication to the host after receiving the second communication, the at least one third communication including at least one setting associated with the device;

receiving a fourth communication from the host confirming that the at least one setting has been stored in the allocated storage, in response to the sending at least one third communication to the host;

changing the at least one setting associated with the device, in response to receiving a request to change the at least one setting from the host; and restoring, by the device, the at least one setting from the restore point, in response to receiving a request from the host for the device to restore the at least one setting, the restoring the at least one setting from the restore point further comprising:

sending, by the device, a fifth communication to the host to request contents of the allocated storage, the contents including the at least one setting;

receiving, by the device, the contents of the allocated storage from the host in response to the sending a fifth communication to the host; and sending, by the device, a sixth communication to the host confirming restoration of the at least one setting.

11. The device of claim 10, wherein the method further comprises:

creating the restore point in a FLASH RAM component of the device when the determining whether the device has storage available for creating a restore point determines that the device has the storage available for creating the restore point.

12. The device of claim 10, wherein the restoring the at least one setting from the restore point, further comprises:

verifying whether a requester making the request for the device to restore the at least one setting from the restore point is authorized, and restoring the at least one setting from the restore point only when the requester is verified as being authorized.

13. The device of claim 10, wherein the restoring the at least one setting from the restore point, further comprises:

verifying whether a requester for the device to restore the at least one setting from the restore point is authorized by validating a digital signature included with the request for the device to restore the at least one setting, and restoring the at least one setting from the restore point only when the digital signature is verified to be valid.

14. A machine-implemented method for saving and restoring at least one setting associated with a first device, the machine-implemented method comprising:

receiving, by a driver residing in a processing device upon which a host resides, a communication from the first device;

determining, by the driver, whether the first device is capable of understanding a command for creating a restore point and a command for restoring at least one setting associated with the first device from a restore point based on a presence or an absence of a code in the received communication, a result of the determining affecting communications between the host and the first device with respect to creating the restore point and restoring the at least one setting of the first device from the restore point;

sending a first request, from the host to the first device, to create the restore point for saving the at least one setting associated with the first device;

sending a second request, from the host to the first device, to change the at least one setting associated with the first device;

detecting an unexpected termination of an application communicating with the first device; and sending, in response to the detecting of the unexpected termination, a third request for restoring the at least one setting associated with the first device, from the host to the first device, to restore the at least one setting from the restore point, wherein:

when the driver determines that the first device is capable of understanding the command for creating a restore point and the command for restoring at least one setting associated with the first device from a restore point, the first request includes only one or more communications other than a request for the at least one setting associated with the first device.

15. The machine-implemented method of claim 14, further comprising:

including a digital signature with the first request and the third request, wherein communications between the first device and the host use a well-known protocol and a set of formats describing communication methods and individual or packaged settings.

16. The machine-implemented method of claim 14, further comprising:
sending, by a server to the first device, a firmware upgrade, the sending being performed by using the host as a pass-through proxy such that the firmware upgrade is not stored by the host, wherein
the at least one setting associated with the first device includes at least a portion of firmware associated with the first device before the firmware upgrade.

17. The machine-implemented method of claim 14, further comprising:
sending, by the host, a firmware upgrade to the first device, wherein
the at least one setting associated with the first device includes at least a portion of firmware associated with the first device before the firmware upgrade.

18. The machine-implemented method of claim 14, further comprising:
receiving, at the host, a request for storage from the first device in response to the sending of the first request;
allocating the storage on the processing device on which the host resides;
sending, to the first device, a confirmation that the storage is allocated;
receiving, at the processing device, the at least one setting from the first device; and
storing the at least one setting in the restore point in the allocated storage.

19. The machine-implemented method of claim 14, further comprising:
receiving, at the host, a request for the at least one setting stored in the restore point in allocated storage, in response to the sending of the third request; and
sending the at least one setting from the restore point to the first device to restore the at least one setting, in response to the receiving, at the host, of the request for the at least one setting stored in the restore point in the allocated storage.

20. The machine-implemented method of claim 14, further comprising:
when the driver determines that the first device is not capable of understanding the command for creating a restore point and the command for restoring at least one setting associated with the first device from a restore point, performing:
sending at least one communication to the first device to request the device to send the at least one setting;
receiving the at least one setting from the first device; and
storing the received at least one setting in a storage device of the processing device on which the host resides.

* * * * *